(12) United States Patent
Thakur et al.

(10) Patent No.: US 10,708,221 B1
(45) Date of Patent: Jul. 7, 2020

(54) GENERATING A NATURAL NAME DATA STRUCTURE TO PREVENT DUPLICATE NETWORK DATA ASSOCIATED WITH AN ASYNCHRONOUS DISTRIBUTED NETWORK OPERATING SYSTEM

(71) Applicant: Juniper Networks, Inc., Sunnyvale, CA (US)

(72) Inventors: Aditya Thakur, Nepean (CA); Srinath Bayareddy, San Jose, CA (US); Vijay Paul, San Jose, CA (US); David Katz, Santa Cruz, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 6 days.

(21) Appl. No.: 16/235,709

(22) Filed: Dec. 28, 2018

(51) Int. Cl.
*G06F 9/44* (2018.01)
*H04L 29/12* (2006.01)
*G06F 16/9032* (2019.01)
*H04L 12/24* (2006.01)

(52) U.S. Cl.
CPC ...... *H04L 61/1582* (2013.01); *G06F 16/9032* (2019.01); *H04L 41/0233* (2013.01); *H04L 41/0816* (2013.01); *H04L 61/2069* (2013.01); *H04L 61/2076* (2013.01); *H04L 61/3005* (2013.01)

(58) Field of Classification Search
None
See application file for complete search history.

(56) References Cited

U.S. PATENT DOCUMENTS

| | | | |
|---|---|---|---|
| 7,113,938 B2 | 9/2006 | Highleyman et al. | |
| 7,372,875 B2 | 5/2008 | Hadzic et al. | |
| 2003/0009540 A1 | 1/2003 | Benfield et al. | |
| 2006/0037019 A1* | 2/2006 | Austin | G06F 8/10 718/100 |
| 2006/0143603 A1* | 6/2006 | Kalthoff | G06F 16/20 717/172 |
| 2017/0068747 A1* | 3/2017 | Qi | G06F 11/3006 |

* cited by examiner

*Primary Examiner* — Natisha D Cox
(74) *Attorney, Agent, or Firm* — Harrity & Harrity, LLP

(57) ABSTRACT

A network device receives first objects defining first network data associated with an asynchronous distributed network and an asynchronous distributed network operating system and generates a natural name graph based on the first objects. The network device provides information describing the natural name graph to other network devices in the asynchronous distributed network and receives a second object defining second network data. The network device determines whether one of the first objects in the natural name graph is a duplicate of the second object and removes the one of the first objects from the natural name graph, to generate an updated natural name graph, when the one of the first objects in the natural name graph is a duplicate of the second object. The network device provides the updated natural name graph to the other network devices to prevent the other network devices from generating erroneous results.

20 Claims, 12 Drawing Sheets

GENERATING A NATURAL NAME DATA STRUCTURE TO PREVENT DUPLICATE NETWORK DATA ASSOCIATED WITH AN ASYNCHRONOUS DISTRIBUTED NETWORK OPERATING SYSTEM

BACKGROUND

Network devices in an asynchronous distributed network utilize an asynchronous distributed network operating system that exchanges objects (e.g., network data defining operational states, configurations, identifications, applications, and/or the like) associated with the network devices and/or components of the network devices.

SUMMARY

According to some implementations, a method may include receiving, by a network device, first objects defining first network data associated with an asynchronous distributed network and an asynchronous distributed network operating system, and generating a natural name graph based on the first objects defining the first network data. The method may include providing information describing the natural name graph to one or more other network devices in the asynchronous distributed network, and receiving a second object defining second network data associated with the asynchronous distributed network and the asynchronous distributed network operating system. The method may include determining whether one of the first objects in the natural name graph is a duplicate of the second object, and removing the one of the first objects from the natural name graph, to generate an updated natural name graph, when the one of the first objects in the natural name graph is a duplicate of the second object. The method may include providing the updated natural name graph to the one or more other network devices to prevent the one or more other network devices from generating erroneous results due to the one of the first objects in the natural name graph being a duplicate of the second object.

According to some implementations, a network device may include one or more memories and one or more processors to receive first objects defining first network data associated with an asynchronous distributed network and an asynchronous distributed network operating system, and generate a natural name graph based on the first objects defining the first network data. The one or more processors may provide information describing the natural name graph to one or more other network devices in the asynchronous distributed network, and may receive a second object defining second network data associated with the asynchronous distributed network and the asynchronous distributed network operating system. The one or more processors may determine whether one of the first objects in the natural name graph is a duplicate of the second object, and may remove the one of the first objects from the natural name graph when the one of the first objects in the natural name graph is a duplicate of the second object. The one or more processors may provide, to the one or more other network devices, a notification, wherein the notification includes information indicating that the one of the first objects was removed from the natural name graph, and information instructing the one or more other network devices to remove the one of the first objects from the natural name graph.

According to some implementations, a non-transitory computer-readable medium may store instructions that include one or more instructions that, when executed by one or more processors of a network device, cause the one or more processors to receive first objects defining first network data associated with an asynchronous distributed network and an asynchronous distributed network operating system. The one or more instructions may cause the one or more processors to generate a natural name graph based on the first objects defining the first network data and provide information describing the natural name graph to one or more other network devices in the asynchronous distributed network. The one or more instructions may cause the one or more processors to receive a second object defining second network data associated with the asynchronous distributed network and the asynchronous distributed network operating system and add the second object to the natural name graph. The one or more instructions may cause the one or more processors to determine whether one of the first objects in the natural name graph is a duplicate of the second object and remove the one of the first objects from the natural name graph when the one of the first objects in the natural name graph is a duplicate of the second object. The one or more instructions may cause the one or more processors to provide, to the one or more other network devices, a notification indicating that the second object was added to the natural name graph, and the one of the first objects was removed from the natural name graph.

DETAILED DESCRIPTION

Figure 1A:
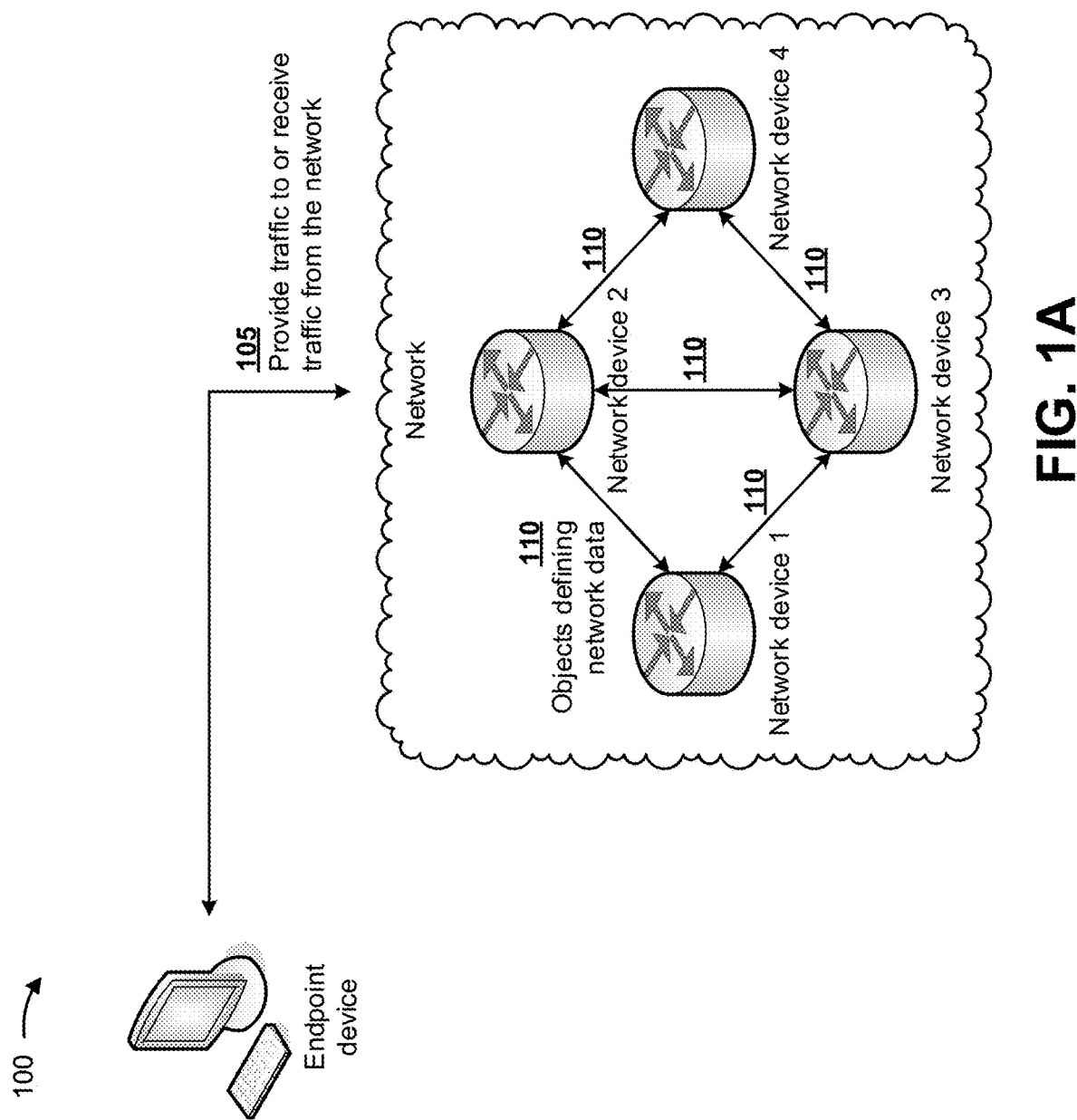
FIGS. 1A-1G are diagrams of an example implementation described herein.

The following detailed description of example implementations refers to the accompanying drawings. The same reference numbers in different drawings may identify the same or similar elements.

A network device in the asynchronous distributed network may receive, at any given time, an object that is duplicative of another object previously received by the network device. Such duplicative objects may cause erroneous results, such as incorrect programming of hardware and/or software resources in the network by the network device, incorrect outputs by the network device, and/or the like. In some cases, duplicate objects may be caused when new objects are created by a network device before existing objects are deleted. In other cases, the network device may delete all objects except a most recent object. However, due to the asynchronous nature of the network, the network device may receive duplicative objects for a particular time period, leading to erroneous results. For hierarchical objects that depend on or exist because of other objects, the network device may receive duplicative hierarchical objects and may erroneously mix data from one hierarchy with another hierarchy.

Some implementations described herein provide a network device that generates a natural name data structure to prevent duplicate network data associated with an asynchronous distributed network operating system. For example, the network device may receive first objects defining first network data associated with an asynchronous distributed network and with an asynchronous distributed network operating system, and may generate a natural name graph based on the first objects defining the first network data. The network device may provide information describing the natural name graph to other network devices in the asynchronous distributed network, and may receive a second object defining second network data associated with the asynchronous distributed network and the asynchronous distributed network operating system. The network device may determine whether one of the first objects in the natural name graph is a duplicate of the second object, and may remove the one of the first objects from the natural name graph, to generate an updated natural name graph, when the one of the first objects in the natural name graph is a duplicate of the second object. The network device may provide the updated natural name graph to the other network devices to prevent the other network devices from generating erroneous results due to the one of the first objects in the natural name graph being a duplicate of the second object.

In this way, duplicative objects in an asynchronous distributed network operating system may be prevented, which prevents erroneous results associated with processing the duplicative objects (e.g., incorrect programming of hardware and/or software resources in the network by the network device, incorrect outputs by the network device, and/or the like). This, in turn, conserves resources (e.g., processing resources, memory resources, and/or the like) that would otherwise be wasted in identifying and/or correcting the erroneous results caused by the duplicative objects.

While the following description focuses on an asynchronous distributed network and an asynchronous distributed network operating system, implementations described herein are equally applicable to other types of networks, operating systems, and/or the like.

FIGS. 1A-1G are diagrams of an example implementation 100 described herein. As shown in FIG. 1A, an endpoint device may be associated with a network. As further shown in FIG. 1A, the network may include multiple network devices, such as a first network device (e.g., network device 1), a second network device (e.g., network device 2), a third network device (e.g., network device 3), a fourth network device (e.g., network device 4), and/or the like. In some implementations, the network may include an asynchronous distributed network with network devices that execute an asynchronous distributed network operating system.

As further shown in FIG. 1A, and by reference number 105, the endpoint device may provide traffic to and/or receive traffic from the network. In some implementations, the traffic from the endpoint device may be provided to one or more of the network devices and the one or more of the network devices may process the traffic accordingly (e.g., by forwarding the traffic to other endpoint devices). In some implementations, traffic may be processed by one or more network devices and forwarded to the endpoint device.

In some implementations, the network devices may generate network data when handling traffic for the network. In some implementations, the network data may include data defining operational states, configurations, identifications, applications and/or the like associated with the network devices and/or components of the network devices. In some implementations, the network data may be generated as objects that define the network data. As further shown in FIG. 1A, and by reference number 110, one or more of the network devices may share the objects defining the network data with one or more other network devices.

Figure 1B:
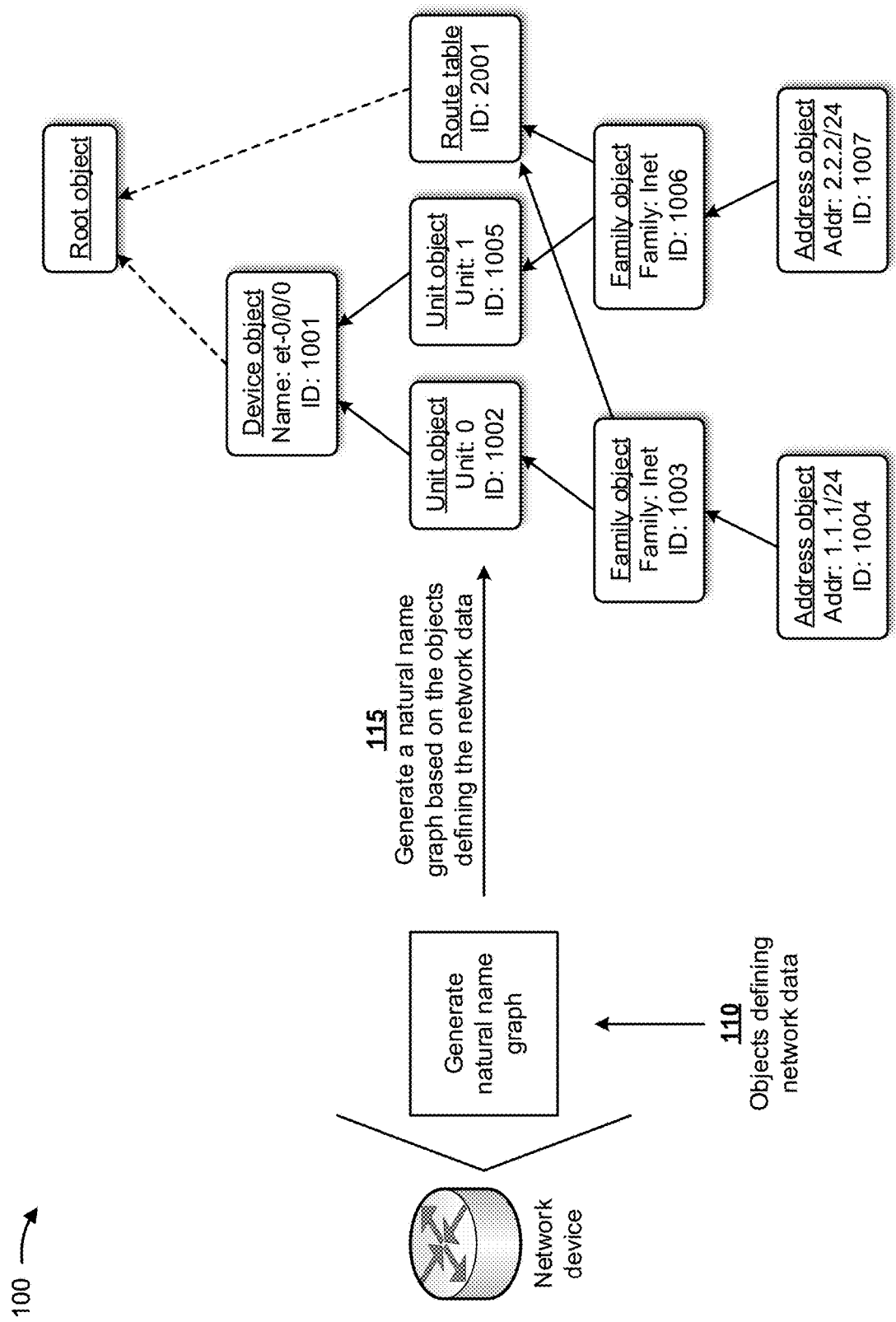

As shown in FIG. 1B, and by reference number 115, a network device may generate a natural name graph (e.g., a distributed data structure, such as a distributed database) that includes nodes based on the objects defining the network data. In some implementations, the network device may be provided with schema for the natural name graph. The schema may enable the network device to generate the natural name graph. In some implementations, the network device may generate the natural name graph by associating names (e.g., addresses, families, units, and/or the like) and identifiers with the objects defining the network data; generating nodes for the natural name graph, to represent the objects defining the network data, based on the names and the identifiers associated with the objects; and generating links between the nodes of the natural name graph to represent dependencies among the objects defining the network data. For example, as shown in FIG. 1B, the natural name graph may include a root node to represent one of the objects with no parent objects, a device node to represent a device object (e.g., name "et-0/0/0" and identifier "1001"), unit nodes to represent unit objects (e.g., names "0" and "1" and identifiers "1002" and "1005"), family nodes to represent family objects (e.g., name "Inet" and identifiers "1003" and "1006"), address nodes to represent address objects (e.g., names "1.1.1/24" and "2.2.2/24" and identifiers "1004" and "1007"), and/or the like.

In some implementations, the root node may include a name that is globally unique throughout the asynchronous distributed network and the asynchronous distributed network operating system. In some implementations, one or more of the nodes (e.g., the unit nodes, the family nodes, and the address nodes) of the natural name graph may include names that are only unique to the parent node (e.g., the device node).

In some implementations, the natural name graph may utilize a hierarchical naming scheme to uniquely identify the objects defining the network data. The name assigned to a node may include a natural name that is derived, from an object represented by the node, without knowing an object type, object content, and/or the like. For example, a name assigned to a node representing a logical unit may include a logical number associated with the logical unit, a name assigned to a node representing an address of a network device may include an Internet protocol (IP) address of the network device, and/or the like.

Figure 1C:
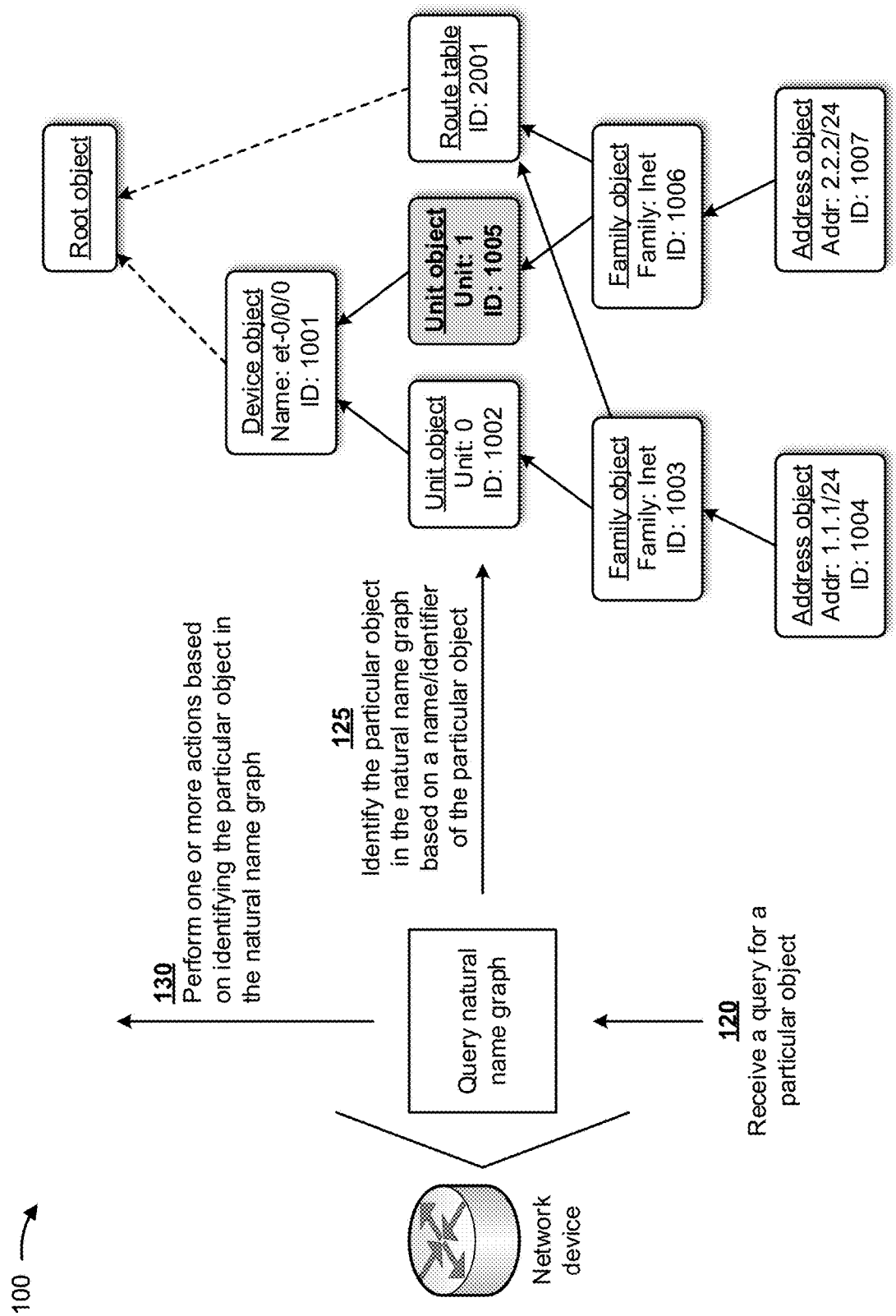

As shown in FIG. 1C, and by reference number 120, the network device may receive a query for a particular object in the natural name graph. In some implementations, the network device may receive the query from another network device in the network. In some implementations, the query may include a request to perform one or more actions based on the particular object. For example, if the particular object includes an object indicating a current state of a port of the network device, the query may include a request to return the current state of the port. In some implementations, if the particular object is not in the natural name graph, the network device may return, to the other network device, an error message indicating that the particular object is not in the natural name graph.

In some implementations, the network device may query for the particular object along a path in the natural name graph based on names and/or identifiers associated with the particular object and objects in the path. In some implementations, the network device may query the particular object relative to any other object in the natural name graph or from a root node of the natural name graph.

As further shown in FIG. 1C, and by reference number 125, the network device may identify the particular object in the natural name graph based on a name and/or an identifier of the particular object. In some implementations, the query may include the name and/or the identifier of the particular object (e.g., name "1" and/or identifier "1005"), and the network device may search the natural name graph for a node that includes the name and/or the identifier of the particular object. For example, as shown in FIG. 1C, the network device may identify the unit node with the name "1" and/or the identifier "1005" as the particular object.

As further shown in FIG. 1C, and by reference number 130, the network device may perform one or more actions based on identifying the particular object in the natural name graph. In some implementations, the one or more actions may include the network device returning (e.g., to the other network device) information associated with the particular object. In some implementations, the one or more actions may include the network device removing the particular object from the natural name graph. In some implementations, the one or more actions may include the network device updating the particular object (e.g., with new network data). In this way, the network device and the other network devices of the network may maintain a current natural name graph and avoid duplicative objects in the natural name graph, which may prevent erroneous results.

Figure 1D:
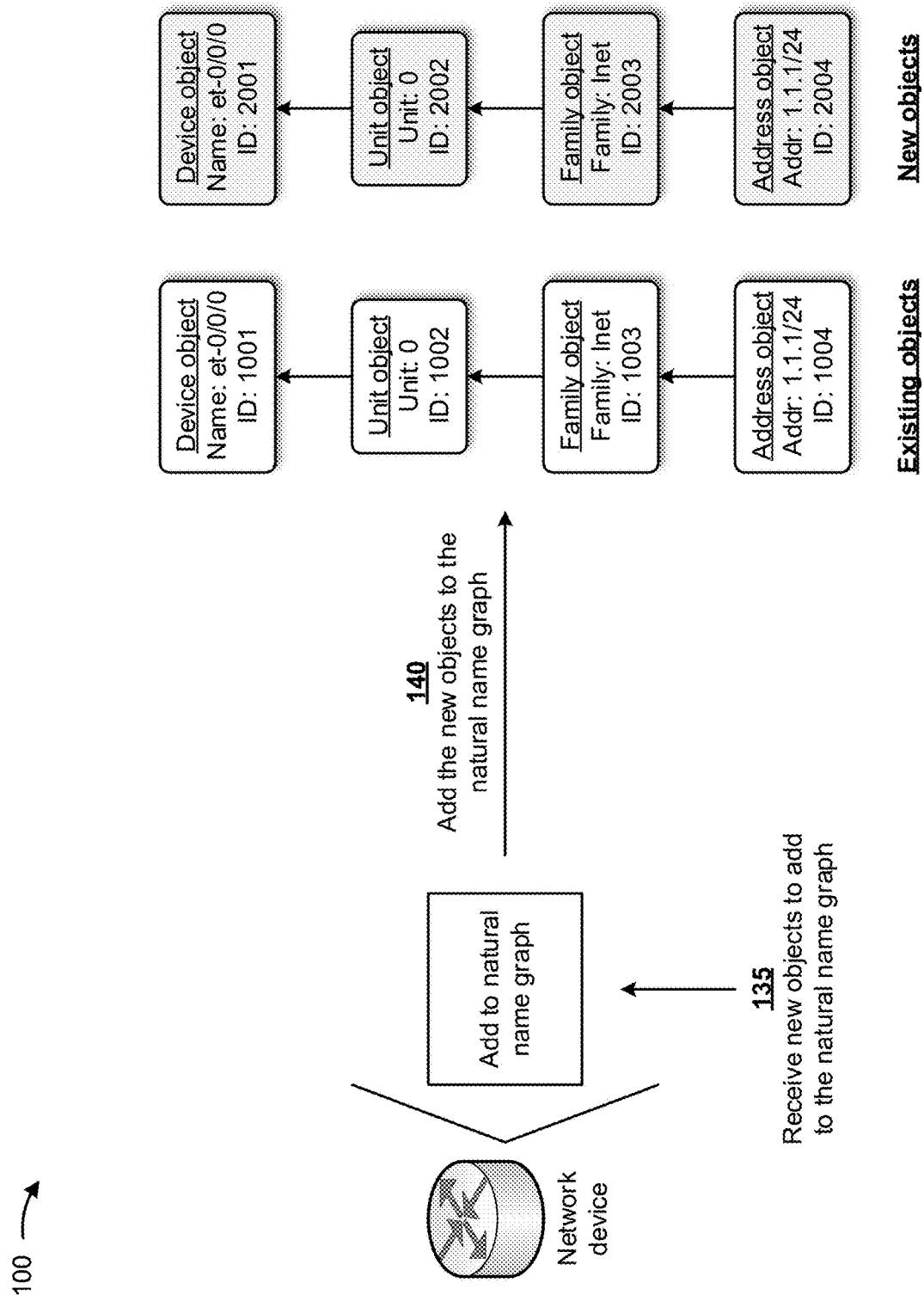

As shown in FIG. 1D, and by reference number 135, the network device may receive new objects (e.g., defining new network data) to add to the natural name graph. In some implementations, the network device may receive the new objects from one or more other network devices of the network. In some implementations, the new network data may include data defining new or updated operational states, new or updated configurations, new or updated identifications, new or updated applications and/or the like associated with the network devices and/or components of the network devices.

As further shown in FIG. 1D, and by reference number 140, the network device may add the new objects to the natural name graph. In some implementations, the network device may add the new objects to the natural name graph by associating names (e.g., addresses, families, units, and/or the like) and identifiers with the new objects defining the new network data; generating nodes for the natural name graph, to represent the new objects defining the new network data, based on the names and the identifiers associated with the new objects; and generating links between the nodes of the natural name graph to represent dependencies among the new objects defining the new network data. For example, as shown in FIG. 1D, the natural name graph may include the nodes for the existing objects (e.g., as described above in connection with FIG. 1B, although some nodes have been omitted for clarity), a device node to represent a new device object (e.g., name "et-0/0/0" and identifier "2001"), a unit node to represent a new unit object (e.g., name "0" and identifier "2002"), a family node to represent a new family object (e.g., name "Ind" and identifier "2003"), an address node to represent a new address object (e.g., name "1.1.1/24" and identifier "2004"), and/or the like.

In some implementations, the network device may provide, to the other network devices, a notification instructing the other network devices to add the new objects to the natural name graphs maintained at the other network devices. In such implementations, the other network devices may add the new objects to the natural name graphs maintained at the other network devices based on the notification and as described above.

Figure 1E:
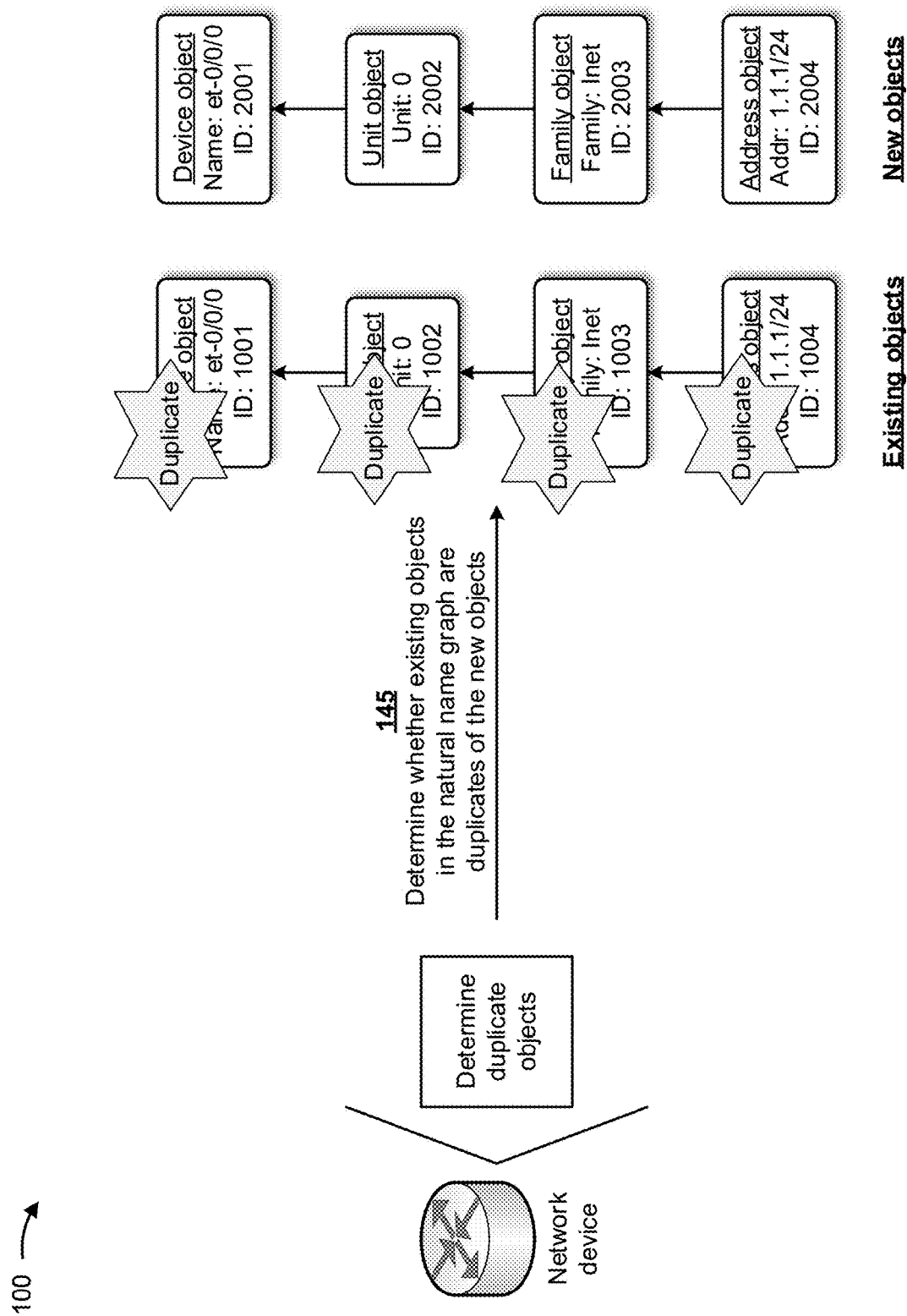

As shown in FIG. 1E, and by reference number 145, the network device may determine whether existing objects in the natural name graph are duplicates of the new objects. In some implementations, the network device may determine whether existing objects in the natural name graph are duplicates of the new objects when the new objects are added to the natural name graph. In some implementations, when attempting to add the new objects to the natural name graph, the network device may determine whether one or more of the new objects are being mapped to locations in the natural name graph to which one or more existing objects were previously mapped. If the one or more of the new objects are being mapped to locations in the natural name graph to which the one or more existing objects were previously mapped, the network device may determine that the one or more existing objects are duplicates of the one or more of the new objects. For example, as further shown in FIG. 1E, the network device may determine that the existing device object (e.g., name "et-0/0/0" and identifier "1001") is a duplicate of the new device object (e.g., name "et-0/0/0" and identifier "2001"), that the existing unit object (e.g., name "0" and identifier "1002") is a duplicate of the new unit object (e.g., name "0" and identifier "2002"), that the existing family object (e.g., name "Inet" and identifier "1003") is a duplicate of the new family object (e.g., name "Ind" and identifier "2003"), and that the existing address object (e.g., name "1.1.1/24" and identifier "1004") is a duplicate of the new address object (e.g., name "1.1.1/24" and identifier "2004").

In some implementations, if the new objects are not being mapped to locations (e.g., nodes) in the natural name graph to which existing objects were previously mapped, the network device may determine that the existing objects are not duplicates of the new objects.

Figure 1F:
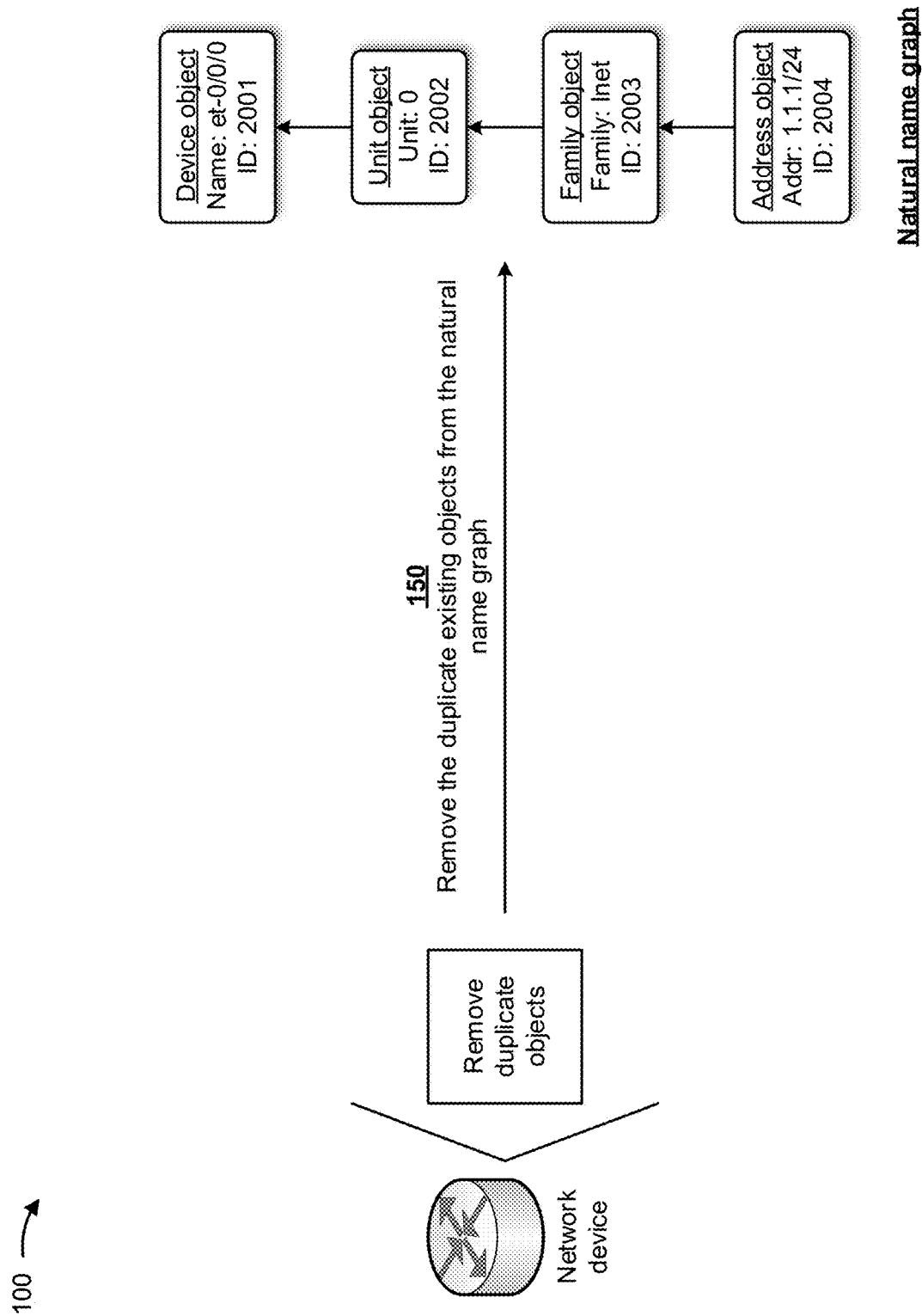

As shown in FIG. 1F, and by reference number 150, the network device may remove the duplicate existing objects from the natural name graph. In some implementations, the network device may add the new objects to the natural name graph before removing the duplicate existing objects from the natural name graph. In some implementations, the network device may remove the duplicate existing objects from the natural name graph before adding the new objects to the natural name graph. For example, as further shown in FIG. 1F, the network device may remove the existing device object (e.g., name "et-0/0/0" and identifier "1001"), the existing unit object (e.g., name "0" and identifier "1002"), the existing family object (e.g., name "Inet" and identifier "1003"), and the existing address object (e.g., name "1.1.1/24" and identifier "1004") from the natural name graph. After removal of the duplicate existing objects, the natural name graph may include the new device object (e.g., name "et-0/0/0" and identifier "2001"), the new unit object (e.g., name "0" and identifier "2002"), the new family object (e.g., name "Inet" and identifier "2003"), and the new address object (e.g., name "1.1.1/24" and identifier "2004").

In some implementations, the network device may initially suppress or hide the duplicate existing objects and the new objects in the natural name graph. In such implementations, the network device may select one of the duplicate existing objects or the new objects to include in the natural name graph. For example, the network device may select the new objects since the new objects include more recent state information. Based on the selection, the network device may remove the duplicate existing objects from the natural name graph and may add the new objects to the natural name graph.

In some implementations, the network device may provide, to the other network devices, a notification instructing the other network devices to remove the duplicate existing objects from the natural name graphs maintained at the other network devices. In such implementations, the other network devices may remove the duplicate existing objects from the natural name graphs maintained at the other network devices based on the notification.

Figure 1G:
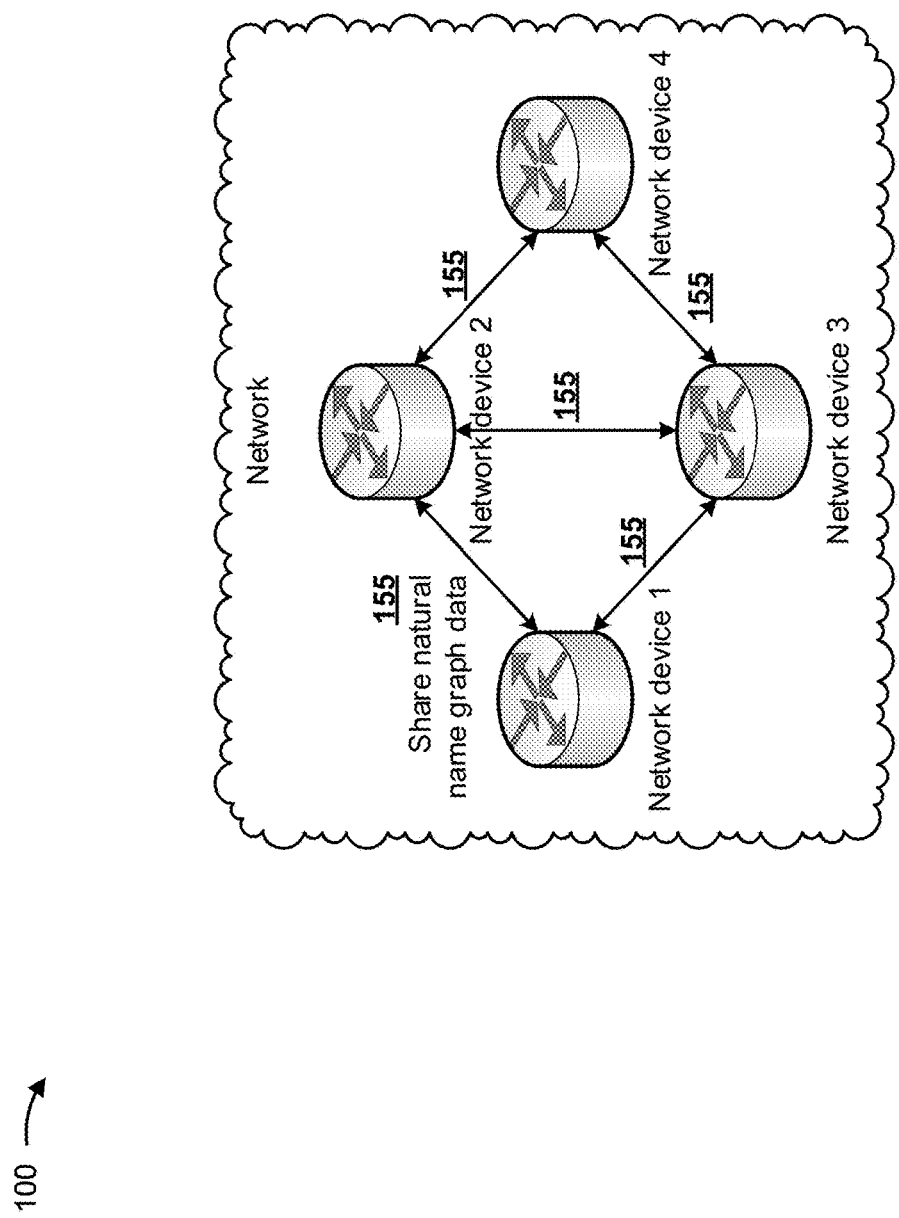

As shown in FIG. 1G, and by reference number 155, the network devices may share natural name graph data associated with the natural name graphs maintained at the network devices. In some implementations, the network devices may share notifications instructing the network devices to remove duplicate existing objects from the natural name graphs maintained at the network devices, notifications instructing the network devices to add new objects to the natural name graphs maintained at the network devices, and/or the like. In this way, the network devices may synchronize the natural name graphs to ensure consistency of the natural name graphs at the network devices.

In this way, the natural name graph prevents duplicative objects in an asynchronous distributed network operating system, which prevents erroneous results associated with processing the duplicative objects and conserves computing resources (e.g., processor resources, memory resources, and/or the like) that would otherwise be wasted in addressing the erroneous results. Furthermore, implementations described herein use a rigorous, computerized process to perform tasks that were not previously performed. For example, currently there does not exist a technique to generate a natural name graph that prevents duplicate network data associated with an asynchronous distributed network operating system.

As indicated above, FIGS. 1A-1G are provided merely as examples. Other examples may differ from what was described with regard to FIGS. 1A-1G.

Figure 2:
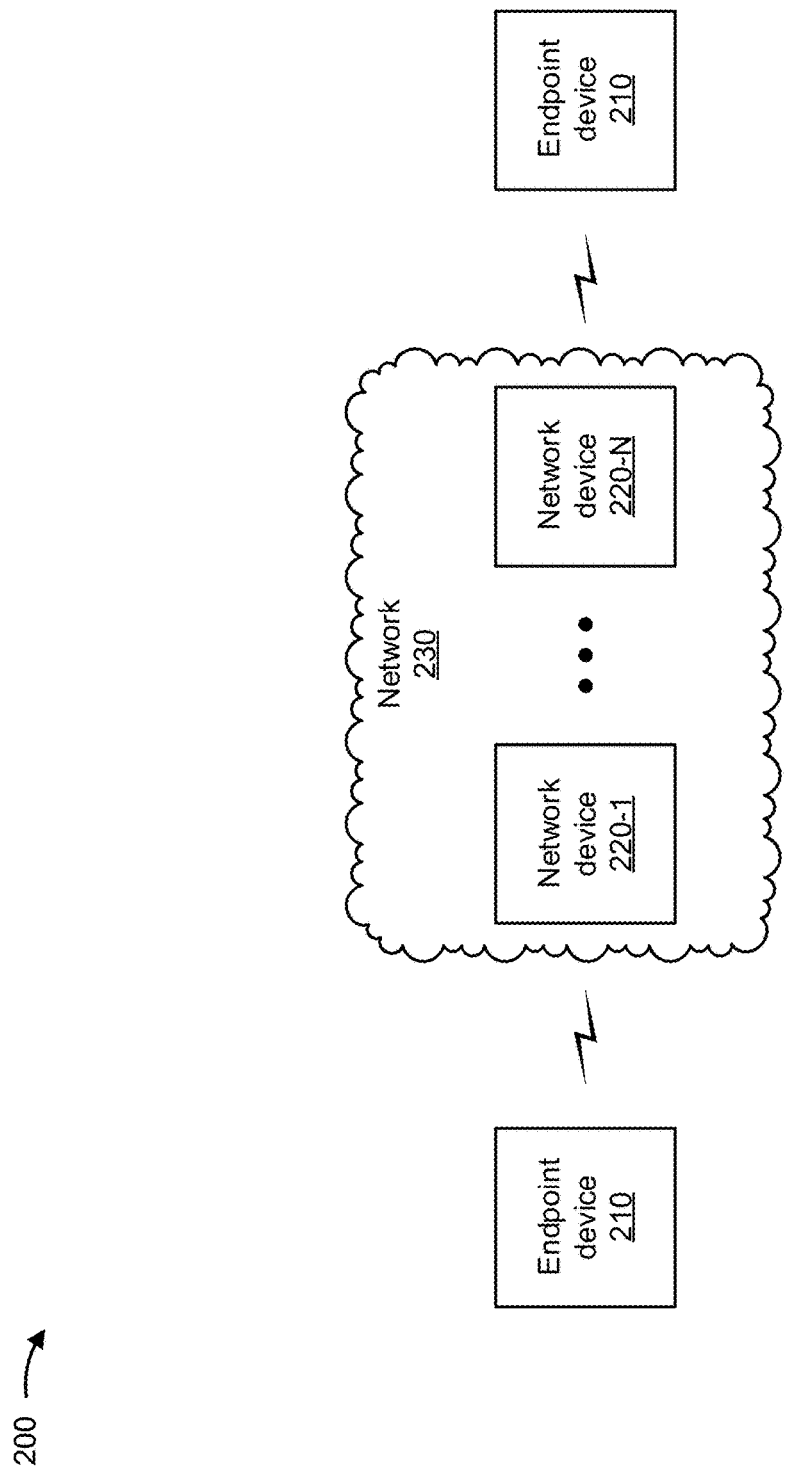
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include one or more endpoint devices 210, a group of network devices 220 (shown as network device 220-1 through network device 220-N), and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), a network device, or a similar type of device. In some implementations, endpoint device 210 may receive network traffic from and/or may provide network traffic to other endpoint devices 210 via network 230 (e.g., by routing packets using network devices 220 as intermediaries).

Network device 220 includes one or more devices capable of receiving, processing, storing, routing, and/or providing traffic (e.g., a packet, a packet replica, other information or metadata, and/or the like) in a manner described herein. For example, network device 220 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 220 may include a gateway, a switch, a firewall, a hub, a bridge, a reverse proxy, a server (e.g., a proxy server, a cloud server, a data center server, etc.), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230. In some implementations, network devices 220 may provide an EVPN multihoming topology.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
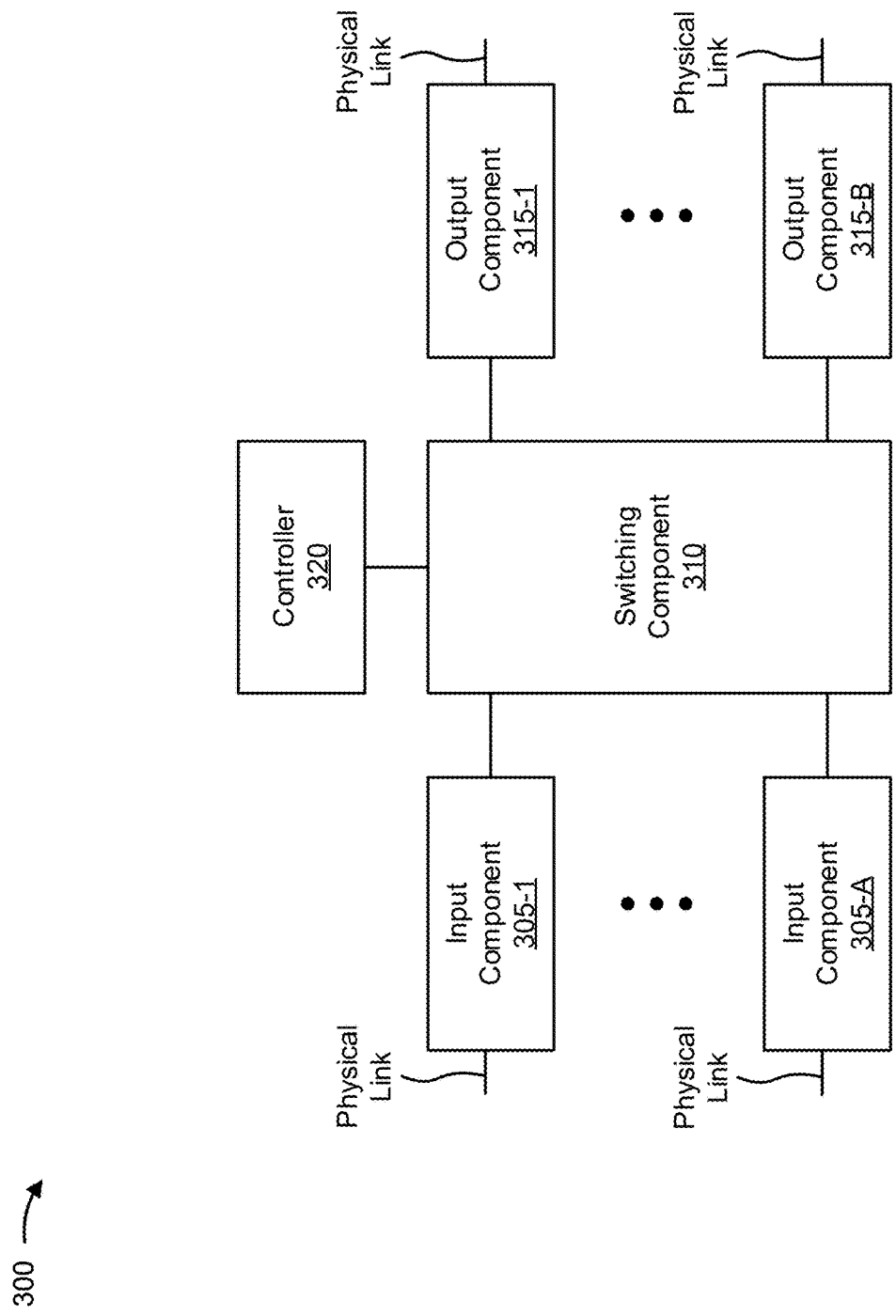
FIG. 3 is a diagram of example components of one or more devices of FIG. 2.

FIG. 3 is a diagram of example components of a device 300. Device 300 may correspond to endpoint device 210 and/or network device 220. In some implementations, endpoint device 210 and/or network device 220 may include one or more devices 300 and/or one or more components of device 300. As shown in FIG. 3, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor or processing component. The processor is implemented in hardware, firmware, or a combination of software and hardware. In some implementations, controller 320 may include one or more processors that can be programmed to perform a function.

In some implementations, controller 320 may include a random-access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets. In some cases, controller 320 may create a session table based on information determined while initializing a link fault detection (e.g., BFD) session, and may forward the session table to input components 305 and/or output components 315.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
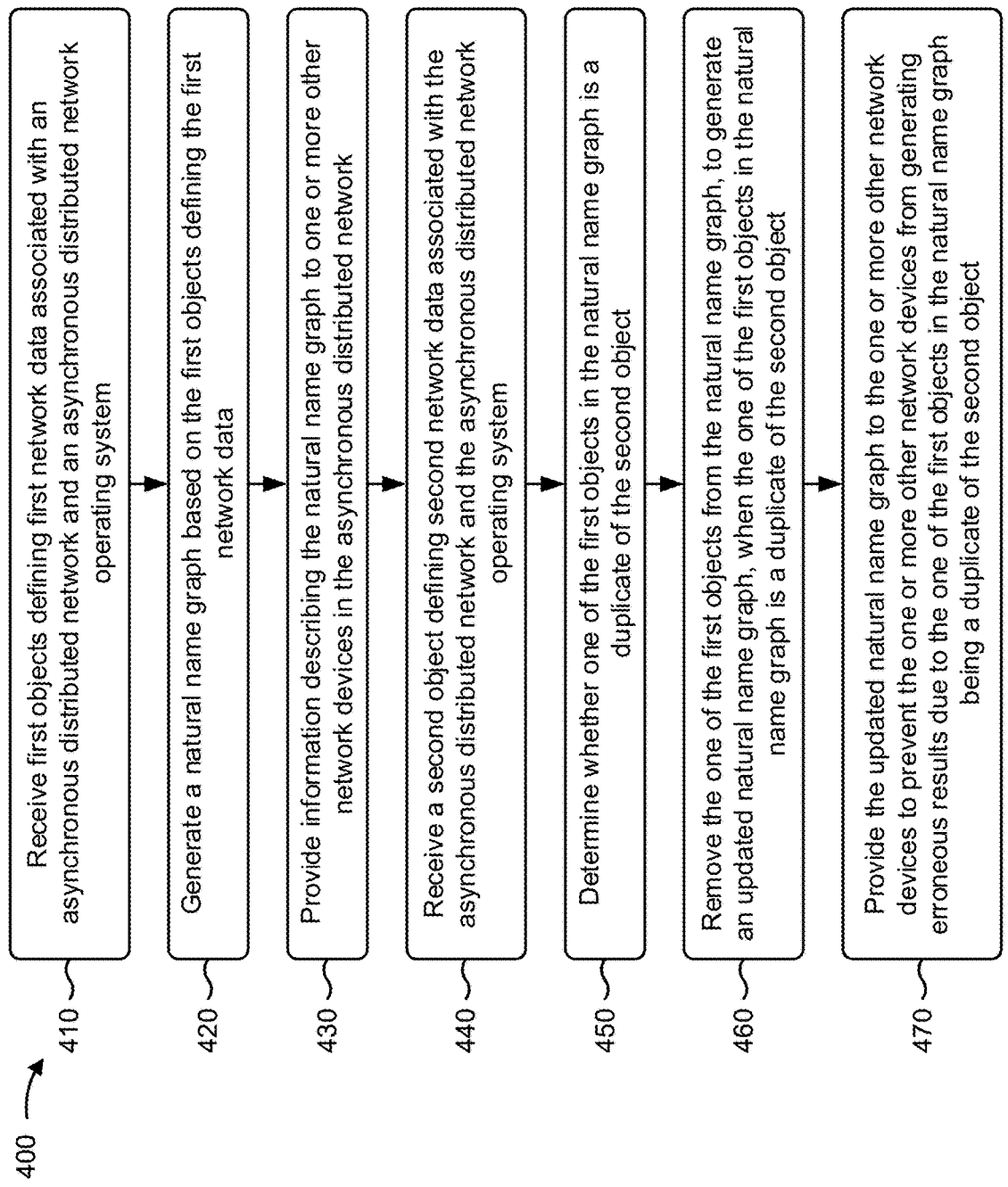
FIGS. 4-6 are flow charts of example processes for generating a natural name data structure to prevent duplicate network data associated with an asynchronous distributed network operating system.

FIG. 4 is a flow chart of an example process 400 for generating a natural name data structure to prevent duplicate network data associated with an asynchronous distributed network operating system. In some implementations, one or more process blocks of FIG. 4 may be performed by a network device (e.g., network device 220). In some implementations, one or more process blocks of FIG. 4 may be performed by another device or a group of devices separate from or including the network device, such as an endpoint device (e.g., endpoint device 210).

As shown in FIG. 4, process 400 may include receiving first objects defining first network data associated with an asynchronous distributed network and an asynchronous distributed network operating system (block 410). For example, the network device (e.g., using input component 305, switching component 310, controller 320, and/or the like) may receive first objects defining first network data associated with an asynchronous distributed network and an asynchronous distributed network operating system, as described above in connection with FIGS. 1A-2.

As further shown in FIG. 4, process 400 may include generating a natural name graph based on the first objects defining the first network data (block 420). For example, the network device (e.g., using switching component 310, controller 320, and/or the like) may generate a natural name graph based on the first objects defining the first network data, as described above in connection with FIGS. 1A-2.

As further shown in FIG. 4, process 400 may include providing information describing the natural name graph to one or more other network devices in the asynchronous distributed network (block 430). For example, the network device (e.g., using switching component 310, output component 315, controller 320, and/or the like) may provide information describing the natural name graph to one or more other network devices in the asynchronous distributed network, as described above in connection with FIGS. 1A-2.

As further shown in FIG. 4, process 400 may include receiving a second object defining second network data associated with the asynchronous distributed network and the asynchronous distributed network operating system (block 440). For example, the network device (e.g., using input component 305, switching component 310, controller 320, and/or the like) may receive a second object defining second network data associated with the asynchronous distributed network and the asynchronous distributed network operating system, as described above in connection with FIGS. 1A-2.

As further shown in FIG. 4, process 400 may include determining whether one of the first objects in the natural name graph is a duplicate of the second object (block 450). For example, the network device (e.g., using switching component 310, controller 320, and/or the like) may determine whether one of the first objects in the natural name graph is a duplicate of the second object, as described above in connection with FIGS. 1A-2.

As further shown in FIG. 4, process 400 may include removing the one of the first objects from the natural name graph, to generate an updated natural name graph, when the one of the first objects in the natural name graph is a duplicate of the second object (block 460). For example, the network device (e.g., using switching component 310, controller 320, and/or the like) may remove the one of the first objects from the natural name graph, to generate an updated natural name graph, when the one of the first objects in the natural name graph is a duplicate of the second object, as described above in connection with FIGS. 1A-2.

As further shown in FIG. 4, process 400 may include providing the updated natural name graph to the one or more other network devices to prevent the one or more other network devices from generating erroneous results due to the one of the first objects in the natural name graph being a duplicate of the second object (block 470). For example, the network device (e.g., using switching component 310, output component 315, controller 320, and/or the like) may provide the updated natural name graph to the one or more other network devices to prevent the one or more other network devices from generating erroneous results due to the one of the first objects in the natural name graph being a duplicate of the second object, as described above in connection with FIGS. 1A-2.

Process 400 may include additional implementations, such as any single implementation or any combination of implementations described below and/or in connection with one or more other processes described elsewhere herein.

In some implementations, the network device may receive a query for a particular object in the natural name graph, may identify the particular object in the natural name graph based on a name of the particular object, and may perform one or more actions based on identifying the particular object in the natural name graph.

In some implementations, the first network data or the second network data may include data defining operational states associated with the network device and/or the one or more other network devices, data defining configurations associated with the network device and/or the one or more other network devices, data defining identifications associated with the network device and/or the one or more other network devices, and/or data defining applications executed by the network device and/or the one or more other network devices.

In some implementations, when generating the natural name graph based on the first objects, the network device may associate names and identifiers with the first objects defining the first network data; may generate nodes for the natural name graph, to represent the first objects defining the first network data, based on the names and the identifiers associated with the first objects; and may generate links between the nodes of the natural name graph to represent dependencies among the first objects defining the first network data.

In some implementations, one or more of the names associated with the first objects may be globally unique throughout the asynchronous distributed network and the asynchronous distributed network operating system, and/or only unique to a parent object. In some implementations, the network device may receive a message indicating that a particular object is to be removed from the natural name graph, and may remove the particular object from the natural name graph based on the message. In some implementations, the network device may provide, to the one or more other network devices, a notification indicating that the one of the first objects was removed from the natural name graph.

Although FIG. 4 shows example blocks of process 400, in some implementations process 400 may include additional blocks, fewer blocks, different blocks, or differently arranged blocks than those depicted in FIG. 4. Additionally, or alternatively, two or more of the blocks of process 400 may be performed in parallel.

Figure 5:
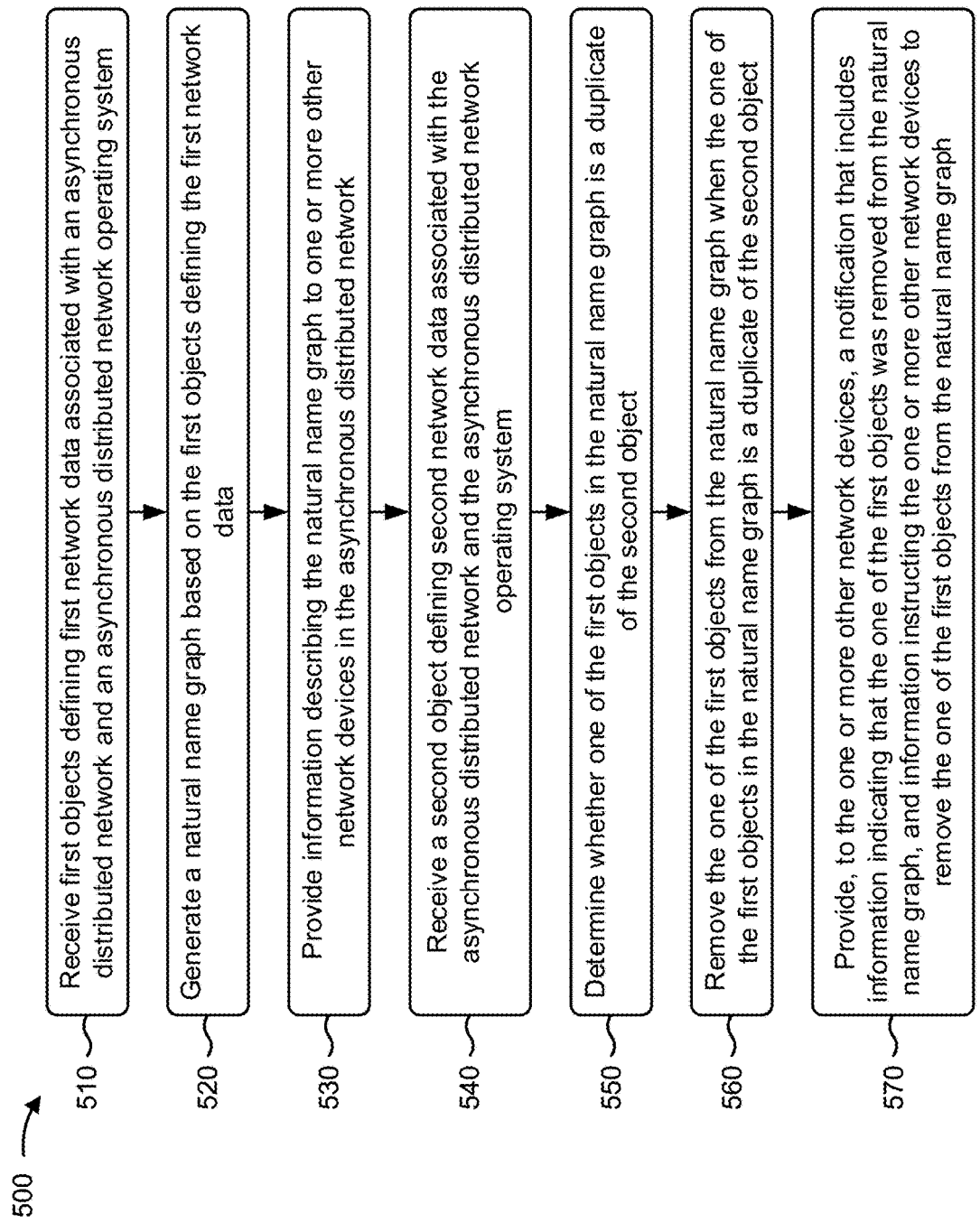

FIG. 5 is a flow chart of an example process 500 for generating a natural name data structure to prevent duplicate network data associated with an asynchronous distributed network operating system. In some implementations, one or more process blocks of FIG. 5 may be performed by a network device (e.g., network device 220). In some implementations, one or more process blocks of FIG. 5 may be performed by another device or a group of devices separate from or including the network device, such as an endpoint device (e.g., endpoint device 210).

As shown in FIG. 5, process 500 may include receiving first objects defining first network data associated with an asynchronous distributed network and an asynchronous distributed network operating system (block 510). For example, the network device (e.g., using input component 305, switching component 310, controller 320, and/or the like) may receive first objects defining first network data associated with an asynchronous distributed network and an asynchronous distributed network operating system, as described above in connection with FIGS. 1A-2.

As further shown in FIG. 5, process 500 may include generating a natural name graph based on the first objects defining the first network data (block 520). For example, the network device (e.g., using input component 305, switching component 310, controller 320, and/or the like) may generate a natural name graph based on the first objects defining the first network data, as described above in connection with FIGS. 1A-2.

As further shown in FIG. 5, process 500 may include providing information describing the natural name graph to one or more other network devices in the asynchronous distributed network (block 530). For example, the network device (e.g., using switching component 310, output component 315, controller 320, and/or the like) may provide information describing the natural name graph to one or more other network devices in the asynchronous distributed network, as described above in connection with FIGS. 1A-2.

As further shown in FIG. 5, process 500 may include receiving a second object defining second network data associated with the asynchronous distributed network and the asynchronous distributed network operating system (block 540). For example, the network device (e.g., using input component 305, switching component 310, controller 320, and/or the like) may receive a second object defining second network data associated with the asynchronous distributed network and the asynchronous distributed network operating system, as described above in connection with FIGS. 1A-2.

As further shown in FIG. 5, process 500 may include determining whether one of the first objects in the natural name graph is a duplicate of the second object (block 550). For example, the network device (e.g., using switching component 310, controller 320, and/or the like) may determine whether one of the first objects in the natural name graph is a duplicate of the second object, as described above in connection with FIGS. 1A-2.

As further shown in FIG. 5, process 500 may include removing the one of the first objects from the natural name graph when the one of the first objects in the natural name graph is a duplicate of the second object (block 560). For example, the network device (e.g., using switching component 310, controller 320, and/or the like) may remove the one of the first objects from the natural name graph when the one of the first objects in the natural name graph is a duplicate of the second object, as described above in connection with FIGS. 1A-2.

As further shown in FIG. 5, process 500 may include providing, to the one or more other network devices, a notification, wherein the notification includes information indicating that the one of the first objects was removed from the natural name graph, and information instructing the one or more other network devices to remove the one of the first objects from the natural name graph (block 570). For example, the network device (e.g., using switching component 310, output component 315, controller 320, and/or the like) may provide, to the one or more other network devices, a notification, as described above in connection with FIGS. 1A-2. In some implementations, the notification may include information indicating that the one of the first objects was removed from the natural name graph, and information instructing the one or more other network devices to remove the one of the first objects from the natural name graph.

Process 500 may include additional implementations, such as any single implementation or any combination of implementations described below and/or in connection with one or more other processes described elsewhere herein.

In some implementations, the network device may receive a request to perform an action on a particular object in the natural name graph, may identify the particular object in the natural name graph based on a name of the particular object, and may perform the action on the particular object based on identifying the particular object in the natural name graph.

In some implementations, the first network data or the second network data may include data defining operational states associated with the network device, one or more components of the network device, the one or more other network devices, and/or one or more components of the one or more other network devices; data defining configurations associated with the network device, one or more components of the network device, the one or more other network devices, and/or one or more components of the one or more other network devices; data defining identifications associated with the network device, one or more components of the network device, the one or more other network devices, and/or one or more components of the one or more other network devices; and/or data defining applications executed by the network device and/or the one or more other network devices.

In some implementations, the natural name graph may include nodes to represent the first objects defining the first network data, where the nodes include names and identifiers associated with the first objects defining the first network data; and may include links, provided between the nodes, to represent dependencies among the first objects defining the first network data.

In some implementations, the natural name graph may include at least one root node to represent one of the first objects with no parent objects, where the at least one root node includes a name that is globally unique throughout the asynchronous distributed network and the asynchronous distributed network operating system. In some implementations, the network device may receive a message indicating that a particular object is to be added to the natural name graph, and may add the particular object to the natural name graph based on the message.

In some implementations, the network device may receive a third object defining third network data associated with the asynchronous distributed network and the asynchronous distributed network operating system, may add the third object to the natural name graph, and may provide, to the one or more other network devices, a notification indicating that the third object was added to the natural name graph.

Although FIG. 5 shows example blocks of process 500, in some implementations process 500 may include additional blocks, fewer blocks, different blocks, or differently arranged blocks than those depicted in FIG. 5. Additionally, or alternatively, two or more of the blocks of process 500 may be performed in parallel.

Figure 6:
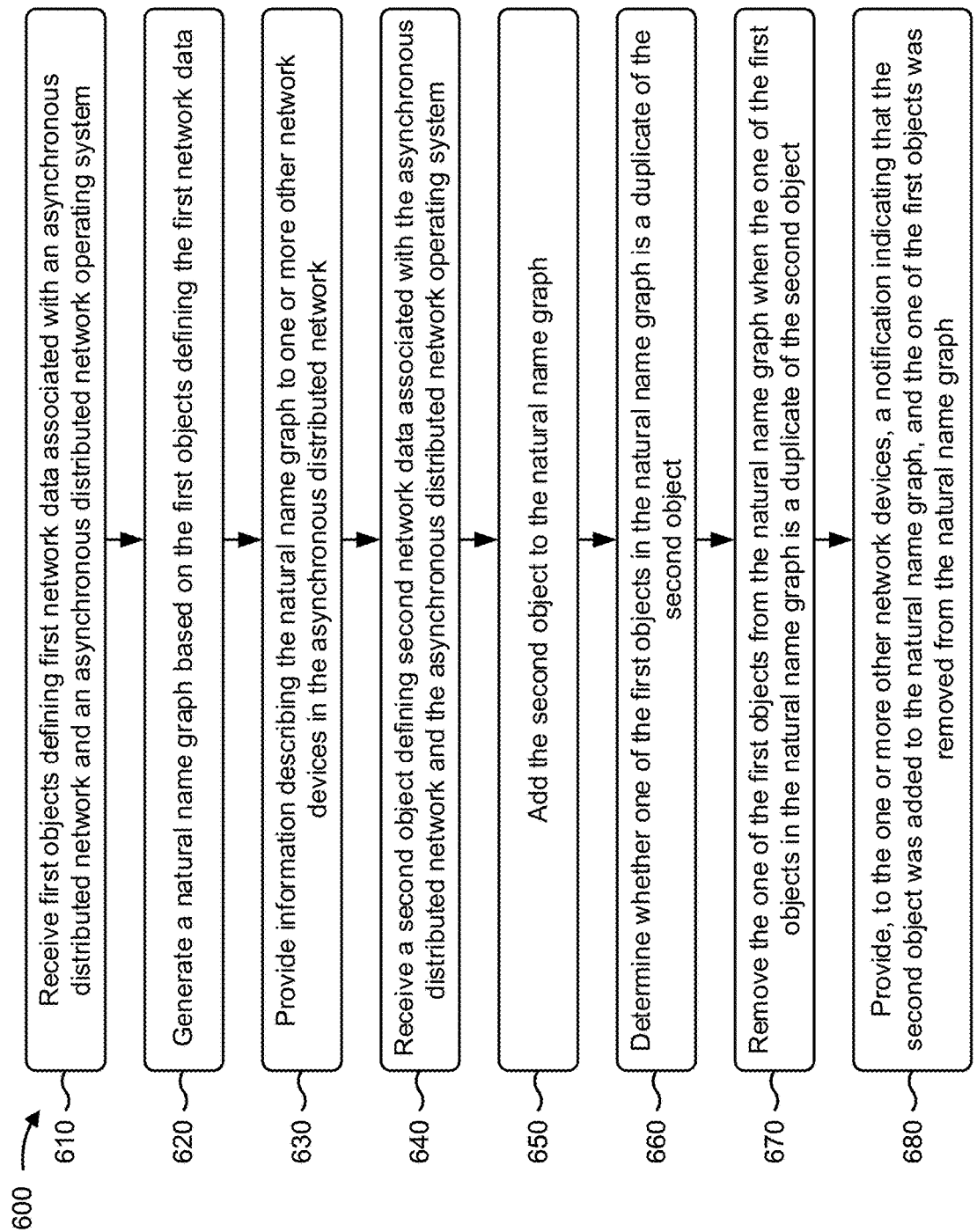

FIG. 6 is a flow chart of an example process 600 for generating a natural name data structure to prevent duplicate network data associated with an asynchronous distributed network operating system. In some implementations, one or more process blocks of FIG. 6 may be performed by a network device (e.g., network device 220). In some implementations, one or more process blocks of FIG. 6 may be performed by another device or a group of devices separate from or including the network device, such as an endpoint device (e.g., endpoint device 210).

As shown in FIG. 6, process 600 may include receiving first objects defining first network data associated with an asynchronous distributed network and an asynchronous distributed network operating system (block 610). For example, the network device (e.g., using input component 305, switching component 310, controller 320, and/or the like) may receive first objects defining first network data associated with an asynchronous distributed network and an asynchronous distributed network operating system, as described above in connection with FIGS. 1A-2.

As further shown in FIG. 6, process 600 may include generating a natural name graph based on the first objects defining the first network data (block 620). For example, the network device (e.g., using switching component 310, controller 320, and/or the like) may generate a natural name graph based on the first objects defining the first network data, as described above in connection with FIGS. 1A-2.

As further shown in FIG. 6, process 600 may include providing information describing the natural name graph to one or more other network devices in the asynchronous distributed network (block 630). For example, the network device (e.g., using switching component 310, output component 315, controller 320, and/or the like) may provide information describing the natural name graph to one or more other network devices in the asynchronous distributed network, as described above in connection with FIGS. 1A-2.

As further shown in FIG. 6, process 600 may include receiving a second object defining second network data associated with the asynchronous distributed network and the asynchronous distributed network operating system (block 640). For example, the network device (e.g., using input component 305, switching component 310, controller 320, and/or the like) may receive a second object defining second network data associated with the asynchronous distributed network and the asynchronous distributed network operating system, as described above in connection with FIGS. 1A-2.

As further shown in FIG. 6, process 600 may include adding the second object to the natural name graph (block 650). For example, the network device (e.g., using switching component 310, controller 320, and/or the like) may add the second object to the natural name graph, as described above in connection with FIGS. 1A-2.

As further shown in FIG. 6, process 600 may include determining whether one of the first objects in the natural name graph is a duplicate of the second object (block 660). For example, the network device (e.g., using switching component 310, controller 320, and/or the like) may determine whether one of the first objects in the natural name graph is a duplicate of the second object, as described above in connection with FIGS. 1A-2.

As further shown in FIG. 6, process 600 may include removing the one of the first objects from the natural name graph when the one of the first objects in the natural name graph is a duplicate of the second object (block 670). For example, the network device (e.g., using switching component 310, controller 320, and/or the like) may remove the one of the first objects from the natural name graph when the one of the first objects in the natural name graph is a duplicate of the second object, as described above in connection with FIGS. 1A-2.

As further shown in FIG. 6, process 600 may include providing, to the one or more other network devices, a notification indicating that the second object was added to the natural name graph, and the one of the first objects was removed from the natural name graph (block 680). For example, the network device (e.g., using switching component 310, output component 315, controller 320, and/or the like) may provide, to the one or more other network devices, a notification indicating that the second object was added to the natural name graph, and the one of the first objects was removed from the natural name graph, as described above in connection with FIGS. 1A-2.

Process 600 may include additional implementations, such as any single implementation or any combination of implementations described below and/or in connection with one or more other processes described elsewhere herein.

In some implementations, the network device may receive a query for a particular object in the natural name graph, may identify the particular object in the natural name graph based on a name of the particular object, may perform one or more actions based on identifying the particular object in the natural name graph, and may provide, to the one or more other network devices, information indicating that the one or more actions were performed. In some implementations, the first network data or the second network data may be received from the one or more other network devices.

In some implementations, when generating the natural name graph based on the first objects, the network device may associate names and identifiers with the first objects defining the first network data, may generate nodes for the natural name graph, to represent the first objects defining the first network data, based on the names and the identifiers associated with the first objects, and may generate links between the nodes of the natural name graph to represent dependencies among the first objects defining the first network data.

In some implementations, at least one of the names associated with the objects may be globally unique throughout the asynchronous distributed network and the asynchronous distributed network operating system. In some implementations, the network device may receive a message indicating that a particular object is to be added or removed from the natural name graph, and may add or remove the particular object from the natural name graph based on the message.

Although FIG. 6 shows example blocks of process 600, in some implementations process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A method, comprising:
  receiving, by a network device, first objects defining first network data associated with an asynchronous distributed network and an asynchronous distributed network operating system;
  generating, by the network device, a natural name graph based on the first objects defining the first network data;
  providing, by the network device, information describing the natural name graph to one or more other network devices in the asynchronous distributed network;

receiving, by the network device, a second object defining second network data associated with the asynchronous distributed network and the asynchronous distributed network operating system;

determining, by the network device, whether one of the first objects in the natural name graph is a duplicate of the second object;

removing, by the network device, the one of the first objects from the natural name graph, to generate an updated natural name graph, when the one of the first objects in the natural name graph is a duplicate of the second object; and providing, by the network device, the updated natural name graph to the one or more other network devices to prevent the one or more other network devices from generating erroneous results due to the one of the first objects in the natural name graph being a duplicate of the second object.

2. The method of claim 1, further comprising:
receiving a query for a particular object in the natural name graph;
identifying the particular object in the natural name graph based on a name of the particular object; and
performing one or more actions based on identifying the particular object in the natural name graph.

3. The method of claim 1, wherein the first network data or the second network data includes one or more of:
data defining operational states associated with the network device and/or the one or more other network devices,
data defining configurations associated with the network device and/or the one or more other network devices,
data defining identifications associated with the network device and/or the one or more other network devices, or
data defining applications executed by the network device and/or the one or more other network devices.

4. The method of claim 1, wherein generating the natural name graph based on the first objects comprises:
associating names and identifiers with the first objects defining the first network data;
generating nodes for the natural name graph, to represent the first objects defining the first network data, based on the names and the identifiers associated with the first objects; and
generating links between the nodes of the natural name graph to represent dependencies among the first objects defining the first network data.

5. The method of claim 4, wherein one or more of the names associated with the first objects are one of:
globally unique throughout the asynchronous distributed network and the asynchronous distributed network operating system, or
only unique to a parent object.

6. The method of claim 1, further comprising:
receiving a message indicating that a particular object is to be removed from the natural name graph; and
removing the particular object from the natural name graph based on the message.

7. The method of claim 1, further comprising:
providing, to the one or more other network devices, a notification indicating that the one of the first objects was removed from the natural name graph.

8. A network device, comprising:
one or more memories; and
one or more processors to:
receive first objects defining first network data associated with an asynchronous distributed network and an asynchronous distributed network operating system;
generate a natural name graph based on the first objects defining the first network data;
provide information describing the natural name graph to one or more other network devices in the asynchronous distributed network;
receive a second object defining second network data associated with the asynchronous distributed network and the asynchronous distributed network operating system;
determine whether one of the first objects in the natural name graph is a duplicate of the second object;
remove the one of the first objects from the natural name graph when the one of the first objects in the natural name graph is a duplicate of the second object; and
provide, to the one or more other network devices, a notification,
wherein the notification includes:
information indicating that the one of the first objects was removed from the natural name graph, and
information instructing the one or more other network devices to remove the one of the first objects from the natural name graph.

9. The network device of claim 8, wherein the one or more processors are further to:
receive a request to perform an action on a particular object in the natural name graph;
identify the particular object in the natural name graph based on a name of the particular object; and
perform the action on the particular object based on identifying the particular object in the natural name graph.

10. The network device of claim 8, wherein the first network data or the second network data includes one or more of:
data defining operational states associated with the network device, one or more components of the network device, the one or more other network devices, and/or one or more components of the one or more other network devices,
data defining configurations associated with the network device, one or more components of the network device, the one or more other network devices, and/or one or more components of the one or more other network devices,
data defining identifications associated with the network device, one or more components of the network device, the one or more other network devices, and/or one or more components of the one or more other network devices, or
data defining applications executed by the network device and/or the one or more other network devices.

11. The network device of claim 8, wherein the natural name graph includes:
nodes to represent the first objects defining the first network data,
wherein the nodes include:
names and identifiers associated with the first objects defining the first network data; and
links, provided between the nodes, to represent dependencies among the first objects defining the first network data.

12. The network device of claim 11, wherein the natural name graph further includes:
    at least one root node to represent one of the first objects with no parent objects,
        wherein the at least one root node includes a name that is globally unique throughout the asynchronous distributed network and the asynchronous distributed network operating system.

13. The network device of claim 8, wherein the one or more processors are further to:
    receive a message indicating that a particular object is to be added to the natural name graph; and
    add the particular object to the natural name graph based on the message.

14. The network device of claim 8, wherein the one or more processors are further to:
    receive a third object defining third network data associated with the asynchronous distributed network and the asynchronous distributed network operating system;
    add the third object to the natural name graph; and
    provide, to the one or more other network devices, a notification indicating that the third object was added to the natural name graph.

15. A non-transitory computer-readable medium storing instructions, the instructions comprising:
    one or more instructions that, when executed by one or more processors of a network device, cause the one or more processors to:
        receive first objects defining first network data associated with an asynchronous distributed network and an asynchronous distributed network operating system;
        generate a natural name graph based on the first objects defining the first network data;
        provide information describing the natural name graph to one or more other network devices in the asynchronous distributed network;
        receive a second object defining second network data associated with the asynchronous distributed network and the asynchronous distributed network operating system;
        add the second object to the natural name graph;
        determine whether one of the first objects in the natural name graph is a duplicate of the second object;
        remove the one of the first objects from the natural name graph when the one of the first objects in the natural name graph is a duplicate of the second object; and
        provide, to the one or more other network devices, a notification indicating that:
            the second object was added to the natural name graph, and
            the one of the first objects was removed from the natural name graph.

16. The non-transitory computer-readable medium of claim 15, wherein the instructions further comprise:
    one or more instructions that, when executed by the one or more processors, cause the one or more processors to:
        receive a query for a particular object in the natural name graph;
        identify the particular object in the natural name graph based on a name of the particular object;
        perform one or more actions based on identifying the particular object in the natural name graph; and
        provide, to the one or more other network devices, information indicating that the one or more actions were performed.

17. The non-transitory computer-readable medium of claim 15, wherein the first network data or the second network data is received from the one or more other network devices.

18. The non-transitory computer-readable medium of claim 15, wherein the one or more instructions, that cause the one or more processors to generate the natural name graph based on the first objects, cause the one or more processors to:
    associate names and identifiers with the first objects defining the first network data;
    generate nodes for the natural name graph, to represent the first objects defining the first network data, based on the names and the identifiers associated with the first objects; and
    generate links between the nodes of the natural name graph to represent dependencies among the first objects defining the first network data.

19. The non-transitory computer-readable medium of claim 18, wherein at least one of the names associated with the objects is globally unique throughout the asynchronous distributed network and the asynchronous distributed network operating system.

20. The non-transitory computer-readable medium of claim 15, wherein the instructions further comprise:
    one or more instructions that, when executed by the one or more processors, cause the one or more processors to:
        receive a message indicating that a particular object is to be added or removed from the natural name graph; and
        add or remove the particular object from the natural name graph based on the message.

* * * * *